US007981993B2

(12) United States Patent
Pellegatti et al.

(10) Patent No.: US 7,981,993 B2
(45) Date of Patent: Jul. 19, 2011

(54) 1-BUTENE ETHYLENE COPOLYMERS

(75) Inventors: Giampaolo Pellegatti, Ferrara (IT); Stefano Spataro, Ferrara (IT); Roberta Marchini, Ferrara (IT); Simona Guidotti, Bologna (IT); Simona Esposito, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 12/452,201

(22) PCT Filed: Jun. 9, 2008

(86) PCT No.: PCT/EP2008/057180
§ 371 (c)(1),
(2), (4) Date: Dec. 18, 2009

(87) PCT Pub. No.: WO2009/000637
PCT Pub. Date: Dec. 31, 2008

(65) Prior Publication Data
US 2010/0137543 A1 Jun. 3, 2010

Related U.S. Application Data

(60) Provisional application No. 60/937,394, filed on Jun. 27, 2007.

(30) Foreign Application Priority Data

Jun. 25, 2007 (EP) .................................... 07110979

(51) Int. Cl.
C08F 210/08 (2006.01)
C08F 210/16 (2006.01)
(52) U.S. Cl. ............... 526/348.6; 526/160; 526/161; 526/170; 526/348; 526/172
(58) Field of Classification Search .................. 526/348, 526/348.6
See application file for complete search history.

(56) References Cited

U.S. PATENT DOCUMENTS

| 5,698,487 | A | 12/1997 | Sacchetti et al. |
| 6,559,252 | B1 | 5/2003 | Horton et al. |
| 6,949,614 | B1 | 9/2005 | Schottek et al. |
| 7,141,527 | B1 | 11/2006 | Van Baar et al. |
| 7,390,862 | B2 * | 6/2008 | Resconi ............... 526/161 |
| 2003/0008984 | A1 | 1/2003 | Kratzer et al. |
| 2003/0134993 | A1 | 7/2003 | Albizzati et al. |
| 2006/0155071 | A1 * | 7/2006 | Morini et al. ........... 525/240 |
| 2006/0235173 | A1 | 10/2006 | Resconi |

FOREIGN PATENT DOCUMENTS

| DE | 19962910 | 12/1999 |
| EP | 0 775707 | 5/1997 |
| WO | WO91/02012 | 2/1991 |
| WO | WO92/00333 | 1/1992 |
| WO | WO01/62764 | 8/2001 |

OTHER PUBLICATIONS

C. J. Carman, R. A. Harrington, and C. E. Wilkes, "Monomer Sequence Distribution in Ethylene-Propylene Rubber Measured by C NMR.3. Use of Reaction Probability Model," *Macromolecules* 1977, 10, pp. 536-543.

Vincenzo Busico, Roberta Cipullo, Ana Borriello, "Regiospecificity of 1-butene polymerization catalyzed by C2-symmetric group IV metallocenes," *Macromol. Rapid Commun.* 1995, 16, pp. 269-274.

Luigi Resconi, Simona Guidotti, Isabella Camurati, Liya E. Nifant and Liya Laishevtsev, "New Catalysts Design for the Simultaneous Control over Polypropylene Molecular Mass and Stereoregularity," *Polymeric Materials: Science & Engineering*, vol. 87, 2002, pp. 76-77.

* cited by examiner

*Primary Examiner* — Roberto Rabago
(74) *Attorney, Agent, or Firm* — Dilworth IP LLC

(57) ABSTRACT

A 1-butene ethylene copolymer having an ethylene derived units content ranging from 15.10% by mol to 18.00% by mol having the following properties: a) distribution of molecular weight lower than 3; preferably b) hardness shore A (measured according to ISO 868) lower than 65; c) tension set lower than 30% at 100% of deformation (ISO 2285) d) no melting point detectable at the DSC; e) Melting enthalpy measured after 10 days of aging at room temperature comprised between 4 and 15 J/g.

7 Claims, No Drawings

1-BUTENE ETHYLENE COPOLYMERS

The present invention relates to 1-butene/ethylene copolymers containing from 15.10% to 18.00% by mol of ethylene derived units having an optimum balance of features. Said copolymers being obtained by using a particular class of metallocene-based catalyst system. Butene-1 copolymers are well known in the art and have a wide range of applicability. In particular, butene-1 copolymers with a low content of comonomer (1-3% by mol) are generally characterized by good properties in terms of pressure resistance, creep resistance, impact strength and can be used in the manufacture of pipes for replacing the metal pipes. One of the key aspects for their application in the pipe sector is the excellent balance between flexibility and rigidity that they must have in order to combine easy pipe workability and mechanical resistance. In addition, butene-1 copolymers with a higher content of comonomer can be used for example as components of blends with other polyolefin or polymeric products, in order to modulate particular properties such as sealing strength, flexibility and softness of the plastic materials.

WO 04/048424 relates to a 1-butene copolymer containing up to 40% by mol of ethylene or propylene derived units. These copolymers are obtained by using titanium based catalyst, therefore they are endowed with a broad molecular weight distribution typical of this class of catalyst system. Furthermore the shore A of the material described in this document can be further improved. In fact the shore A of a polymer containing 12.4% mol of ethylene derived units is equal to 75 while the polymer of the present invention are considerably harder even they have a lower ethylene content.

WO 04/099269 relates to 1-butene/ethylene polymer wherein the content of ethylene derived units ranges from 0.2 to 15% by mol. The applicant found that by increasing the ethylene content up to a certain level it is possible to achieve a copolymer having an optimum balance of hardens and elasticity.

An object of the present invention is a 1-butene ethylene copolymer having an ethylene derived units content ranging from 15.10% by mol to 18.00% by mol preferably from 15.50% by mol to 17% by mol; more preferably from 15.50% by mol to 16.50% by mol having the following properties:
a) distribution of molecular weight Mw/Mn lower than 3;
b) hardness shore A (measured according to ISO 868) lower than 65; preferably lower than 60
c) tension set lower than 30% at 100% of deformation (ISO 2285) preferably lower than 20;
d) no melting point detectable at the DSC, measured according to the methods described in this document;
e) melting enthalpy, measured after 10 days of aging at room temperature measured according to the methods described in this document, comprised between 4 and 15 J/g; preferably between 5 and 10 J/g.

The 1-butene/ethylene copolymer object of the present invention presents a good balance between hardeness and elastic behavior better described in term of tension set, other than it shows good values of clarity.

The 1-butene/ethylene copolymer according to the present invention does not show a melting point after it has been melted according to the common DSC procedure, however it is crystallizable, i.e. after about 10 days that it has been melted the copolymer shows a melting point and a melting enthalpy.

The 1-butene/ethylene copolymers of the present invention are preferably endowed with tensile stress at break measured according to ISO 527 comprised between 3 MPa and 20 MPa, preferably between 4 and 13 MPa. Preferably the 1-butene/ethylene copolymers of the present invention are also endowed with an elongation at break measured according to ISO 527 ranging from 550% to 800%; preferably from 600% to 750%.

The 1-butene/ethylene copolymers of the present invention are also endowed with an high molecular weight, expressed in terms of intrinsic viscosity (IV) it is higher than 1,; preferably higher than 1.5; more preferably higher than 2. The intrinsic viscosity (IV is preferably not higher than 3. Higher IV makes very difficult the processability of the compound. Due to these well balanced features the 1-butene/ethylene copolymers of the present invention can be fit as modifier in compositions wherein there is the need to improve the elasticity. In particular the 1-butene/ethylene copolymer of the present invention can be used in compositions suitable for making films fiber sheets or compositions for injection molding and blow molding. Furthermore the 1-butene/ethylene copolymer of the present invention can be used as viscosity modifier, impact modifier elastic modifier and in general application wherein elasticity and clarity are requested.

The 1-butene/ethylene copolymer object of the present invention can be obtained by contacting under polymerization conditions 1-butene and ethylene in the presence of a catalyst system obtainable by contacting:
(A) a stereorigid metallocene compound;
(A) an alumoxane or a compound capable of forming an alkyl metallocene cation; and optionally
(B) an organo aluminum compound.

Preferably the stereorigid metallocene compound belongs to the following formula (I):

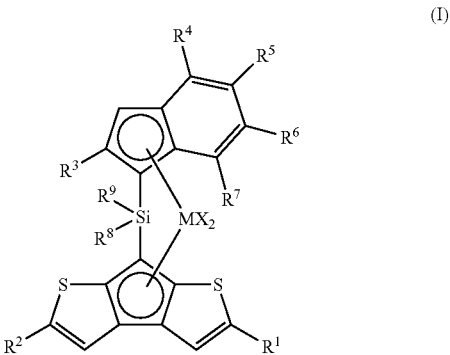

wherein:
M is an atom of a transition metal selected from those belonging to group 4; preferably M is zirconium;
X, equal to or different from each other, is a hydrogen atom, a halogen atom, a R, OR, OR'O, $OSO_2CF_3$, OCOR, SR, $NR_2$ or $PR_2$ group wherein R is a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radical, optionally containing heteroatoms belonging to groups 13-17 of the Periodic Table of the Elements; and R' is a $C_1$-$C_{20}$-alkylidene, $C_6$-$C_{20}$-arylidene, $C_7$-$C_{20}$-alkylarylidene, or $C_7$-$C_{20}$-arylalkylidene radical; preferably X is a hydrogen atom, a halogen atom, a OR'O or R group; more preferably X is chlorine or a methyl radical;
$R^1$, $R^2$, $R^5$, $R^6$, $R^7$, $R^8$ and $R^9$, equal to or different from each other, are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; or $R^5$ and $R^6$, and/or $R^8$ and $R^9$ can optionally form a saturated or unsaturated, 5 or 6 membered rings, said ring can bear $C_1$-$C_{20}$ alkyl radicals as substituents; with the proviso that at least one of $R^6$ or $R^7$ is a linear or branched, saturated or unsaturated $C_1$-$C_{20}$-alkyl radical, optionally containing heteroatoms belonging to groups 13-17 of the Periodic Table of the Elements; preferably a $C_1$-$C_{10}$-alkyl radical;

preferably $R^1$, $R^2$, are the same and are $C_1$-$C_{10}$-alkyl radicals optionally containing one or more silicon atoms; more preferably R' and $R^2$ are methyl radicals;

$R^8$ and $R^9$, equal to or different from each other, are preferably $C_1$-$C_{10}$ alkyl or $C_6$-$C_{20}$ aryl radicals; more preferably they are methyl radicals;

$R^5$ is preferably a hydrogen atom or a methyl radical; or can be joined with $R^6$ to form a saturated or unsaturated, 5 or 6 membered rings, said ring can bear $C_1$-$C_{20}$ alkyl radicals as substituents;

$R^6$ is preferably a hydrogen atom or a methyl, ethyl or isopropyl radical; or it can be joined with $R^5$ to form a saturated or unsaturated, 5 or 6 membered rings as described above;

$R^7$ is preferably a linear or branched, saturated or unsaturated $C_1$-$C_{20}$-alkyl radical, optionally containing heteroatoms belonging to groups 13-17 of the Periodic Table of the Elements; preferably a $C_1$-$C_{10}$-alkyl radical; more preferably $R^7$ is a methyl or ethyl radical; otherwise when $R^6$ is different from a hydrogen atom, $R^7$ is preferably a hydrogen atom $R^3$ and $R^4$, equal to or different from each other, are linear or branched, saturated or unsaturated $C_1$-$C_{10}$-alkyl radicals, optionally containing heteroatoms belonging to groups 13-17 of the Periodic Table of the Elements; preferably $R^3$ and $R^4$ equal to or different from each other are $C_1$-$C_{10}$-alkyl radicals; more preferably $R^3$ is a methyl, or ethyl radical; and $R^4$ is a methyl, ethyl or isopropyl radical;

(C) an alumoxane or a compound capable of forming an alkyl metallocene cation; and optionally (D) an organo aluminum compound.

Preferably the compounds of formula (I) have formula (Ia) or (Ib):

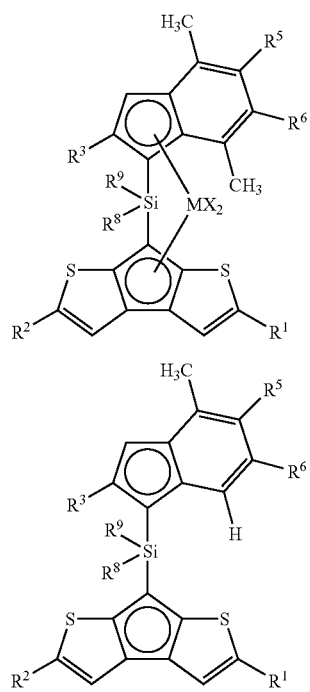

Wherein

M, X, $R^1$, $R^2$, $R^5$, $R^6$, $R^8$ and $R^9$ have been described above; $R^3$ is a linear or branched, saturated or unsaturated $C_1$-$C_{20}$-alkyl radical, optionally containing heteroatoms belonging to groups 13-17 of the Periodic Table of the Elements; preferably $R^3$ is a $C_1$-$C_{10}$-alkyl radical; more preferably $R^3$ is a methyl, or ethyl radical.

Alumoxanes used as component B) can be obtained by reacting water with an organo-aluminium compound of formula $H_jAlU_{3-j}$ or $H_jAl_2U_{6-j}$, where U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or C7-C20-arylalkyl radical, optionally containing silicon or germanium atoms with the proviso that at least one U is different from halogen, and j ranges from 0 to 1, being also a non-integer number. In this reaction the molar ratio of Al/water is preferably comprised between 1:1 and 100:1. The molar ratio between aluminium and the metal of the metallocene generally is comprised between about 10:1 and about 20000:1, and more preferably between about 100:1 and about 5000:1. The alumoxanes used in the catalyst according to the invention are considered to be linear, branched or cyclic compounds containing at least one group of the type:

wherein the substituents U, same or different, are described above.

In particular, alumoxanes of the formula:

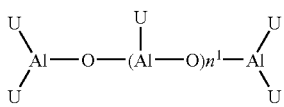

can be used in the case of linear compounds, wherein $n^1$ is 0 or an integer from 1 to 40 and the substituents U are defined as above, or alumoxanes of the formula:

can be used in the case of cyclic compounds, wherein $n^2$ is an integer from 2 to 40 and the U substituents are defined as above. Examples of alumoxanes suitable for use according to the present invention are methylalumoxane (MAO), tetra-(isobutyl)alumoxane (MAO), tetra-(2,4,4-trimethyl-pentyl) alumoxane (TIOAO), tetra-(2,3-dimethylbutyl)alumoxane (TDMBAO) and tetra-(2,3,3-trimethylbutyl)alumoxane (TTMBAO). Particularly interesting cocatalysts are those described in WO 99/21899 and in WO01/21674 in which the alkyl and aryl groups have specific branched patterns. Non-limiting examples of aluminium compounds according to WO 99/21899 and WO01/21674 are:

tris(2,3,3-trimethyl-butyl)aluminium, tris(2,3-dimethyl-hexyl)aluminium, tris(2,3-dimethyl-butyl)aluminium, tris(2,3-di methyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl) aluminium, tris(2-ethyl-3-methyl-butyl)aluminium, tris(2-ethyl-3-methyl-pentyl)aluminium, tris(2,3-diethyl-pentyl) aluminium, tris(2-propyl-3-methyl-butyl)aluminium, tris(2- isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl) aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl) aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl] aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred. Non-limiting examples of compounds able to form an allylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion F comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation arc compounds of formula $BAr_3P$ wherein P is a substituted or unsubstituted pyrrol radicals. These compounds are described in WO01/62764. Other examples of cocatalyst can be found in EP 775707 and DE 19917985. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^{+E-}$ are:
Triethylammoniumtetra(phenyl)borate,
Trimethylammoniumtetra(tolyl)borate,
Tributylammoniumtetra(tolyl)borate,
Tributylammoniumtetra(pentafluorophenyl)borate,
Tripropylammoniumtetra(dimethylphenyl)borate,
Tributylammoniumtetra(trifluoromethylpheny)borate,
Tributylammoniumtetra(4-fluorophenyl)borate,
N,N-Dimethylaniliniumtetra(phenyl)borate,
N,N-Dimethylaniliniumtetrakis(pentafluorophenyl)borate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(phenyl)aluminate,
Ferroceniumtetrakis(pentafluorophenyl)borate,
N,N-Dimethylaniliniumtetrakis(pentafluorophenyl)borate.

Organic aluminum compounds used as compound C) are those of formula $H_jAlU_{3-j}$ or $H_jAl_2U_{6-j}$ described above. The catalysts of the present invention can also be supported on an inert carrier. This is achieved by depositing the metallocene compound A) or the product of the reaction thereof with the component B), or the component B) and then the metallocene compound A) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at a temperature ranging from 25° C. to 90° C. or the process is carried out at room temperature.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633272. Another class of inert supports particularly suitable far use according to the invention is that of polyolefin porous prepolymers, particularly polyethylene.

A further suitable class of inert supports for use according to the invention is that of porous magnesium halides such as those described in International application WO 95/32995.

the process for the polymerization of 1-butene and ethylene according to the invention can be carried out in the liquid phase in the presence or absence of an inert hydrocarbon solvent, such as in slurry, or in the gas phase. The hydrocarbon solvent can either be aromatic such as toluene, or aliphatic such as propane, hexane, heptane, isobutane or cyclohexane. Preferably the copolymers of the present invention are obtained by a solution process, i.e. a process carried out in liquid phase wherein the polymer is completely or partially soluble in the reaction medium As a general rule, the polymerization temperature is generally comprised between −100° C. and +200° C. preferably comprised between 40° and 90° C., more preferably between 50° C. and 80° C. The polymerization pressure is generally comprised between 0.5 and 100 bar. The lower the polymerization temperature, the higher arc the resulting molecular weights of the polymers obtained.

The melting points of the polymers ($T_m$) were measured by Differential Scanning Calorimetry (D.S.C.) on an Perkin Elmer DSC-7 instrument, according to the following method. A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. Successively, after cooling to −20° C. with a scanning speed corresponding to 10° C./minute, the peak temperature was taken as crystallization temperature ($T_c$). After standing 5 minutes at −20° C., the sample was heated for the second time at 200° C. with a scanning speed corresponding to 10° C./min. In this second heating run, the peak temperature was taken as the melting temperature ($T_m$) and the area as global melting enthalpy ($\Delta H_f$).

The melting enthalpy after 10 days was measured as following by using the Differential Scanning Calorimetry (D.S.C.) on an Perkin Elmer DSC-7 instrument. A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. The sample was then stored for 10 days at room temperature. After 10 days the sample put on the DSC, it was cooled to −20° C., and then it was heated at 200° C. with a scanning speed corresponding to 10° C./min. In this heating run, the peak temperature was taken as the melting temperature ($T_m$) and the area as global melting enthalpy ($\Delta H_f$).

The following examples are for illustrative purpose and do not intend to limit the scope of the invention.

EXAMPLES

The intrinsic viscosity (I.V.) was measured in tetrahydronaphtalene (THN) at 135° C. The melting points of the polymers ($T_m$) were measured by Differential Scanning Calorimetry (D.S.C.) on an Perkin Elmer DSC-7 instrument, according to the following method.

A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. Successively, after cooling to −20° C. with a scanning speed corresponding to 10° C./minute, the peak temperature was taken as crystallization temperature ($T_a$). After standing 5 minutes at −20° C., the sample was heated for the second time at 200° C. with a scanning speed corresponding to 10° C./min. In this second heating run, the peak temperature was taken as the melting temperature ($T_m$) and the area as global melting enthalpy ($\Delta H_f$).

The melting enthalpy after 10 days was measured as following by using the Differential Scanning Calorimetry (D.S.C.) on an Perkin Elmer DSC-7 instrument:

A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. The sample was then stored for 10 days at room temperature. After 10 days the sample put on the DSC, it was cooled to −20° C., and then it was heated at 200° C. with a scanning speed corresponding to 10° C./min. In this heating run, the peak temperature was taken as the melting temperature ($T_m$) and the area as global melting enthalpy ($\Delta H_f$).

$^{13}$C-NMR spectra were acquired on a DPX-400 spectrometer operating at 100.61 MHz in the Fourier transform mode at 120° C. The peak of the $2B_2$ carbon (nomenclature according to Carman, C. J.; Harrington, R. A.; Wilkes, C. E. *Macromolecules* 1977, 10, 535) was used as internal reference at 27.73. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove 1H-13C coupling. About 3000 transients were stored in 32K data points using a spectral window of 6000 Hz. Assignments of 4,1 insertion were made according to Busico (V. Busico, R. Cipullo, A. Borriello, *Macromol. Rapid. Commun.* 1995, 16, 269-274)

Metallocene Compounds

Dimethylsilanediyl {(1-(2,4,7-trimethylindenyl)-7-(2,5-dimethyl-cyclopenta[1,2-b:4,3-b']-dithiophene)}Zirconium dichloride (A1) was prepared according to WO 01/47939.

Synthesis of Dimethylsilanediyl{(1-(2,4,7-trimethylindenyl)-7-(2,5-di methyl-cyclopenta[1,2-b:4,3-b']-dithiophene)}Zirconium dimethyl (A2)

30.40 g of [1-(2,4,7-trimethylindenyl)][7-(2,5-dimethyl-cyclopenta[1,2-b:4,3-b']-dithiophene)]dimethylsilane and 170 mL of anhydrous THF were charged under nitrogen in a cylindrical glass reactor equipped with magnetic stirring bar. The brown solution so obtained was cooled and maintained at 0° C., while 58.4 mL of a 2.5 M n-BuLi solution in hexane (146 mmol) were added dropwise via dropping funnel. At the end of the addition, the dark brown solution was stirred for 1 hour at room temperature. Then it was cooled to −50° C. and 48.6 mL of MeLi 3.05 M in diethoxymethane (148.2 mmol) were slowly added. In a 250 mL Schlenk flask, 16.84 g of ZrCl4 (MW=233.03 g/mol, 72.26 mmol) were slurried in 170 mL of toluene. Both mixtures were kept at −50° C. and the ZrCl4 slurry was quickly added to the ligand dianion solution. At the end of the addition, the reaction mixture was allowed to reach room temperature and stirred for an additional hour. A yellow-green suspension was obtained. 1H NMR analysis (file rld 20949-282) showed complete conversion to the target complex. All volatiles were removed under reduced pressure, and the obtained free flowing brown powder was suspended in 100 mL of Et2O. After stirring for a few minutes, the suspension was filtered over a G4 frit. The solid on the frit was then washed twice with Et2O (until the washing solvent turned from brown to yellow), then dried under vacuum, and finally extracted on the frit with warm toluene (60° C.), until the filtering solution turned from yellow to colorless (about 650 mL of toluene were used). The extract was dried under reduced pressure to give 28.6 g of yellow powder, which proved to be the pure complex by $^1$H-NMR (file rld 20949-284). The yield based on the ligand was 73.3%.

1H-NMR: (CD2Cl2, r.t.), ppm: −2.09 (s, Zr—CH3, 3H); −0.79 (s, Zr—CH3, 3H); 1.01 (s, Si—CH3, 3H); 1.04 (s, Si—CH3, 3H); 2.38 (s, CH3 in 4 or 7, 3H); 2.39 (s, CH3 in 2, 3H); 2.43 (d, 3H, methyl group in S2, J=1.37 Hz); 2.52 (s, CH3 in 7 or 4, 3H); 2.57 (d, 3H, methyl group in S2, J=1.37 Hz); 6.61 (dq, H5 or H6, 1H, J=7.04 Hz, J=0.78 Hz); 6.81 (q, CH in S2, 1H, J=1.37 Hz); 6.85 (dq, H6 o H5, 1H, J=7.04 Hz, J=0.78 Hz); 6.87 (q, CH in S2, 1H, J=1.37 Hz); 6.91 (s, H3, 1H).

Preparation of the Catalytic Solutions methylalumoxane (MAO) was supplied by Albemarle as a 30% wt./wt. toluene solution (d=0.92 g/mL) and used as such. Standard triisobutyl aluminium alkyl (TIBA) was supplied by Crompton as pure chemical and further diluted in anhydrous isododecane or cyclohexane, yielding colourless solutions with a concentration of ca. 100 g/L. All chemicals were handled using standard Schlenk techniques.

Catalyst C1A2

(MAO/TIBA, $Al_{TOT}$/Zr=400 mol/mol, $Al_{MAO}$/Zr=267 mol/mol in toluene/cyclohexane)

19.0 mg of A2 were charged at room temperature under nitrogen atmosphere into a 25 mL Schlenk flask, equipped with a magnetic stirrer. At the same time 2.0 mL of MAO Albemarle 30% wt. in toluene ($Al_{MAO}$/Zr=267) were charged at room temperature under nitrogen atmosphere into a second 25 mL Schlenk flask. Triisobutyl aluminium in cyclohexane (8.2 mL, conc. 113 g/L, 4.69 mmol, $Al_{TIBA}$/Zr=133, $Al_{TOT}$/Zr=400 mol/mol, MAO/TIBA=2/1 mol/mol) was then added at room temperature to MAO, obtaining a colourless solution, which was stirred at r.t. for 1 h. Finally this solution of alkyls in cyclohexane/toluene was slowly added at room temperature under nitrogen atmosphere to the metallocene, obtaining a clear dark-red catalytic solution. The latter was further diluted with 4.7 mL of anhydrous cyclohexane and then stirred for 15 min at room temperature and used as such in polymerizations. The solution concentration was of 100 g of total catalyst (metallocene plus MAO plus TIBA) for each liter of solution, while the concentration of A2 resulted to be 1.275 mg of metallocene for each mL of solution.

Catalyst C2A1
(MAO/TIBA, $Al_{TOT}/Zr=400$ mol/mol, $Al_{MAO}/Zr=267$ mol/mol in toluene/isododecane)

62.7 mg of Al were charged at room temperature under nitrogen atmosphere into a 100 mL Schlenk flask, equipped with a magnetic stirrer. At the same time 6.05 mL of MAO Albemarle 30% wt. in toluene (28.8 mmol, $Al_{MAO}/Zr=267$) were charged at room temperature under nitrogen atmosphere into a 50 mL Schlenk flask. Triisobutyl aluminium (TIBA) in cycloexane (25 mL, conc. 114 g/L, 14.4 mmol, $Al_{TIBA}/Zr=133$, $Al_{TOT}/Zr=400$ mol/mol, MAO/TIBA=2/1 mol/mol) was then added at room temperature to MAO, obtaining a colourless solution, which was stirred at r.t. for 1 hour. Finally this solution of alkyls in isododecane/toluene was slowly added at room temperature under nitrogen atmosphere to the metallocene, previously suspended into 14 mL of anhydrous cycloexane. The resulting clear dark-red catalytic solution was stirred for 1-2 hours at room temperature and used as such in polymerizations. The solution concentration was of 100 g of total catalyst (metallocene plus MAO plus TIBA) for each liter of solution, while the concentration of $Z_S39Me_2$ resulted to be 1.39 mg of metallocene for each mL of solution.

Polymerizations
General Procedure a Copolymerizations in Bulk. Examples 2,4

A 4.4 L jacketed stainless-steel autoclave, equipped with a magnetically driven stirrer and a 35-mL stainless-steel vial, connected to a thermostat for temperature control, was previously purified by washing with an $Al^iBu_3$ solution in isohexanes and dried at 60° C. in a stream of nitrogen. The amount of monomers and solvent initially charged is reported on table 1 The scavenger (6 mmol of $Al^iBu_3$ as solution in isohexane) and the monomers were charged at room temperature into the autoclave. The latter is then thermostated at the polymerization temperature (70° C.). When pressure and temperature of the autoclave were constant, the solution containing the catalysticocatalyst mixture was charged in the stainless-steel vial and injected into the autoclave by nitrogen overpressure. Ethylene was continuously fed over the polymerization time (1 h) with a Flow Record & Control system (FRC) to maintain the pressure at the desired value (11÷15 bar-g). At the end of polymerizations time, stirring was interrupted; the pressure into the autoclave was increased with nitrogen up to 20 bar-g. The bottom discharge valve was opened and the copolymer was discharged into a heated steel tank and treated for 10 min with water steam. The tank heat-ing was switched off and a flow of nitrogen at 0.5 bar-g was fed to remove the water. After cooling at room temperature, the steel tank was opened and the wet polymer collected. The wet polymer was dried overnight in an oven under reduced pressure at 70° C. The polymerization conditions are reported in table 1, the features of the polymers obtained are reported in table 2

General Procedure B Copolymerizations in Cyclohexane. (Examples 1,3,5)

A 4.4 L jacketed stainless-steel autoclave, equipped with a magnetically driven stirrer and a 35-mL stainless-steel vial, connected to a thermostat for temperature control, was previously purified by washing with an $Al^iBu_3$ solution in isohexanes and dried at 60° C. in a stream of nitrogen. The amount of monomers and solvent initially charged is reported on table 1.

The scavenger (6 mmol of $Al^iBu_3$ as solution in isohexane), cyclohexane and monomers were charged at room temperature into the autoclave. The latter is then thermostated at the polymerization temperature (70° C.). When pressure and temperature of the autoclave were constant, the solution containing the catalyst/cocatalyst mixture was charged in the stainless-steel vial and injected into the autoclave by nitrogen overpressure. A constant butene/ethylene mixture (ratio depending on desired copolymer composition) was continuously fed over the polymerization time (1 h) with Flow Record & Control system (FRC) to maintain the pressure at the desired value (8÷13 bar-g). At the end of polymerizations time, stirring was interrupted; the pressure into the autoclave was increased with nitrogen up to 20 bar-g. The bottom discharge valve was opened and the copolymer was discharged into a heated steel tank and treated for 10 min with water steam. The tank heating was switched off and a flow of nitrogen at 0.5 bar-g was fed to remove the water. After cooling at room temperature, the steel tank was opened and the wet polymer collected. The wet polymer was dried overnight in an oven under reduced pressure at 70° C. The polymerization conditions are reported in table 1, the features of the polymers obtained are reported in table 2

TABLE 1

| Ex | Cat | MC (mg) | C4 charged (g) | C2 charged (g) | C4 fed (g) | C2 fed (g) | C2% wt NMR |
|---|---|---|---|---|---|---|---|
| 1* | C1A2 | 1.27 | 878 | 4.4 | 108.6 | 2.3 | 2.5 |
| 2* | C2A1 | 1.3 | 1344 | 12 | — | 16.9 | 5 |
| 3* | C1A2 | 1.27 | 871 | 11.4 | 170.8 | 9.5 | 6 |
| 4 | C2A1 | 1 | 1331 | 22 | — | 13.8 | 8.5 |
| 5* | C1A2 | 0.89 | 864 | 18.8 | 211.9 | 18.8 | 10.2 |

C4 = 1-butene
C2 = ethylene
*comparative

The obtained polymers have been analyzed; the results are reported in table 2

TABLE 2

| | Test Method | unit | 1* | 2* | 3* | 4 | 5* |
|---|---|---|---|---|---|---|---|
| C2 content by NMR | | % wt | 2.5 | 5 | 6 | 8.5 | 10.2 |
| I.V. | | dl/g | 1.5 | 1.8 | 1.8 | 2.6 | 2.1 |
| Mechanical Properties[1] | | | | | | | |
| Hardness Shore A | ISO 868 | — | >90 | 89.7 | 77.7 | 56.6 | 17.5 |
| Tensile Strength at Break[2] | ISO 527 | MPa | 34.7 | 22.6 | 17.6 | 6.8 | Na |
| Elongation at Break[2] | ISO 527 | % | 500 | 550 | 600 | 700 | Na |
| Tension Set at 100% deformation | ISO 2285 | % | 100 | 84 | 42 | 18 | Na |

TABLE 2-continued

| | Test Method | unit | 1* | 2* | 3* | 4 | 5* |
|---|---|---|---|---|---|---|---|
| Melting point | | °C. | Na | Nd | Nd | Nd | Nd |
| Melting enthalpy | | J/g | Na | Nd | Nd | Nd | Nd |
| Melting enthalpy after 10 days | | J/g | Na | Na | Na | 7.0 | Na |

(1)Measured in compression molded samples, aged two weeks prior to testing
(2)5A specimen type, strain rate of 500 mm/min
Nd not detectable
Na = not available
*comparative

The invention claimed is:

1. A 1-butene ethylene copolymer having an ethylene derived units content ranging from 15.10% by mol to 18.00% by mol having the following properties:
   a) distribution of molecular weight Mw/Mn lower than 3;
   b) hardness shore A (measured according to ISO 868) lower than 65;
   c) tension set lower than 30% at 100% of deformation (ISO 2285);
   d) no melting point detectable at the DSC at the second heating scan; and
   e) melting enthalpy measured after 10 days of aging at room temperature comprised between 4 and 15 J/g.

2. The 1-butene ethylene copolymer according to claim 1 wherein the melting enthalpy of feature e) is between 5 and 10 J/g.

3. The 1-butene ethylene copolymer according to claim 1 endowed with tensile stress at break measured according to ISO 527 comprised between 3 MPa and 20 MPa.

4. The 1-butene ethylene copolymer according to claim 1 having an intrinsic viscosity (IV) measured in tetrahydronaphtalene higher than 1.

5. The 1-butene ethylene copolymer according to claim 2 endowed with tensile stress at break measured according to ISO 527 comprised between 3 MPa and 20 MPa.

6. The 1-butene ethylene copolymer according to claim 2 having an intrinsic viscosity (IV) measured in tetrahydronaphtalene higher than 1.

7. The 1-butene ethylene copolymer according to claim 3 having an intrinsic viscosity (IV) measured in tetrahydronaphtalene higher than 1.

* * * * *